United States Patent Office 3,392,027
Patented July 9, 1968

3,392,027
PROCESS FOR MANUFACTURING FLAVOR-
ING MATERIAL FROM COCOA SHELL-CON-
TAINING CHOCOLATE MANUFACTURING
BY-PRODUCTS
Earl H. Hess, Lancaster, Pa., assignor to Bachman
Chocolate Manufacturing Company, Mount Joy,
Pa., a corporation of Pennsylvania
No Drawing. Filed Mar. 29, 1965, Ser. No. 443,642
20 Claims. (Cl. 99—26)

ABSTRACT OF THE DISCLOSURE

A method of making a flavoring material from cocoa shells which are separated as by-products after the roasting of cocoa beans. The method comprises extracting the flavoring material by adding the cocoa shells to a water bath, maintaining the bath at an elevated temperature for a period of time sufficient to effect substantial extraction of the flavoring material, and recovering the flavoring material. Generally maintaining the temperature at approximately 95–100° C. for approximately one hour is sufficient to effect substantially complete extraction. In a preferred embodiment a mildly basic compound such as sodium carbonate is added to the water bath during extraction and the pH of the recovered flavoring material is lowered by adding an acid, preferably to a pH of approximately 7. In another embodiment the by-product cocoa shells in the water bath are digested with an enzyme before beginning the extraction. The flavoring material can be substituted for cocoa powder in a recipe which calls for such flavoring.

This invention relates generally to flavoring materials and their methods of manufacture, and relates more particularly to the production of a cocoa-like flavoring material from cocoa shell-containing, chocolate manufacturing by-products and use of such materials in edible substances.

Cocoa beans in their shells are conventionally processed by roasting the same at elevated temperatures until the kernel dehydrates and shrinks away from the shell wall. The shells are then cracked and separated from the kernels which are further processed in various ways to produce cocoa powder and other known chocolate products. Those shell fractions containing a significant quantity of kernel or nibs are heated and pressed to remove their fat content for various uses, the residue from this procedure being known as "expeller cake." The shells and expeller cake are normally considered waste by-products for which little use other than as a fertilizer has been found.

It is a primary object of this invention to provide a procedure for utilizing cocoa shell-containing by-products in the manufacture of a cocoa-like flavoring material. Consistent with this main objective, the present invention is directed to providing a cocoa-like flavoring material for use in edible foods for human consumption in lieu of conventional cocoa powder to provide exceptionally flavorable products.

A still further primary object hereof is to provide a method of producing a cocoa-like flavoring material from cocoa shell-containing by-products which is extremely simple and inexpensive to practice and which produces a high yield of a good-quality product. In effecting this last objective, the method of the instant invention utilizes extremely inexpensive processing ingredients with relatively short treating times, yet resulting in substantially complete extraction of the flavor components from the cocoa shells.

An additional significant and basic object of the present invention is to provide a method of producing a cocoa-like flavoring material which is useful in edible products for human consumption having no ingredients more harmful to the human body than cocoa powder itself and, in fact, being lower in fat content thereby making the same more desirable for use in various diet foods. Consistent with this objective, the cocoa-like flavoring material of this invention has good shelf life being capable of storage under various conditions for extended periods.

In addition to the basic concept of the instant invention, that is, the production of a cocoa-like flavoring material from normally waste by-products, various procedures are suggested herein for upgrading or improving the product realized, while still utilizing relatively simple manipulative steps and relatively inexpensive processing materials. To this end, it has been recognized that cocoa shells, like the cocoa beans themselves, vary in quality from batch to batch particularly in relation to the region in which the cocoa beans were grown. Thus, while with certain cocoa shells the most simple of the procedures disclosed herein may be adequate to provide the desired product, in other instances it may be of value to modify the procedures somewhat in order to increase the quality of the cocoa-like flavoring material obtained.

As pointed out hereinabove, cocoa shells heretofore have normally been considered as a waste by-product utilizable only as a fertilizer material. After cracking the shells to remove the same from the roasted cocoa beans, they are normally separated from the kernels by a conventional air classification procedure. Basically, the cracked shells can be separated into a coarse fraction, a medium fraction, and a fines fraction, the former comprising the major portion and having a particle size larger than a 6 mesh screen, the intermediate fraction having a small percentage of nibs with the shell and generally passing through a 6 mesh screen and being received on a 16 mesh screen, and the latter fraction including a larger percentage of nibs although too much shell is present to be utilized in the manufacture of cocoa powder, this fraction being the remainder which passes through the 16 mesh screen. The medium and fines fractions are normally further processed resulting in the expeller cake. To appreciate the general form of these various materials, the following table sets forth analytical results of one sample of by-products comparing the same with conventional cocoa powder.

| Material | Percent Moisture | Percent Protein | | Percent Fat | | Percent Fiber | |
|---|---|---|---|---|---|---|---|
| | | As Rec'd | Dry Wt. | As Rec'd | Dry Wt. | As Rec'd | Dry Wt. |
| Coarse Shells | 0.6 | 18.2 | 18.3 | 4.4 | 4.4 | 17.6 | 17.7 |
| Medium Shells | 0.8 | 15.7 | 15.8 | 8.0 | 8.1 | 16.4 | 16.5 |
| Fines | 1.0 | 17.4 | 17.6 | 20.7 | 20.9 | 11.0 | 11.1 |
| Expeller Cake | 2.8 | 20.6 | 21.2 | 5.0 | 5.1 | 21.8 | 22.4 |
| Cocoa Powder | 2.4 | 26.7 | 26.7 | 13.3 | 13.6 | 4.2 | 4.3 |

The above information is set forth as background to facilitate an understanding of the procedures to be defined hereinafter.

In its basic aspects, the present invention provides a flavoring material from cocoa shell-containing, chocolate manufacturing by-products by adding a quantity of the same to a water bath and maintaining the mixture of by-product and water at an elevated temperature for a period of time sufficient to effect substantial extraction of the flavoring material from the shells, following which the product is separated from the residue and concentrated, if desired.

While it is obvious that the particular quantitative relationship between the by-product and the water, as well as the processing temperature and time, may be varied over relatively large ranges, optimum extraction has been obtained by adding approximately 200 grams of by-product for each liter of water and maintaining the mixture at a temperature of from about 95 to 100° C. for approximately 1 hour.

The use of various organic solvents in place of the water, while possible, has not been found necessary in view of the desirable results obtained by an aqueous system which offers obvious advantages from the standpoint of economy and processing ease.

Vigorous stirring of the mixture of by-product and water was found to emulsify and remove a significant amount of the fat, about 11 percent of that normally present, although the quality of the extract was not otherwise improved. Extension of the extraction period substantially beyond one hour or use of multiple extractions have also found to be of little value. Substantially all of the removable flavor is simply and effectively extracted by a single one-hour processing treatment in water maintained at about 95 to 100° C.

Surprisingly, it has been discovered that, while a cocoa-like flavoring material may be extracted from the fines, it is not particularly strong or tasteful as compared with extract produced utilizing medium or coarse shells. In fact, in contradistinction to what would normally be expected, the flavoring material obtained by extraction from the coarse shells was found to impart a better taste to edible products than either the extract of medium shells, fines, or even cocoa powder itself. Approximately twice as much fines-extract was necessary to impart a cocoa-like bavor in edible products comparable to a quantity of flavoring material extracted from coarse shells.

Thus, while a useful flavoring material may be produced from fines or medium shells, it has been found most desirable to utilize substantially all coarse shells in the procedure set forth hereinabove.

Preferably, the liquor obtained during the extraction procedure is separated from the residue by a suction filtration or other similar procedure. The residue is then washed with additional water and the filtrate and washings are mixed and subjected to a conventional vacuum evaporation procedure in order to concentrate the product approximately 5 times to form a syrup of sufficient strength for use in most applications.

While the simplest procedure, that is a hot-water extraction, has been shown to produce a cocoa-like flavoring material which is acceptable as a cocoa powder replacement, improvement in the flavor of the extract can be realized by various modifications of the basic processing treatment of the by-products. For example, a substantial improvement can be effected by the incorporation of a small quantity of a mildly alkaline compound in the mixture of by-product and water during the extraction treatment. Exemplary of such additives are sodium carbonate, potassium carbonate, and ammonium carbonate, the most desirable compound being sodium carbonate in an amount equal to approximately 5 percent based on the weight of the shells.

The addition of the carbonate raises the pH of the flavoring material to approximately 8. While this product may be used directly, it has been found advantageous to reduce the pH somewhat by addition of an acidic material. The pH of a flavoring material produced in the absence of the carbonate is approximately 5.2. While it is possible to reduce the pH of the carbonate-treated material to the original level, it has been found to be desirable to merely render the material neutral, that is, lower the pH to approximately 7. Numerous acidic materials are useful for this purpose including phosphoric acid, sulfuric acid, and tartaric acid although best taste results have been realized which the use of phosphoric acid. Further, this material is particularly advantageous in that it is relatively inexpensive when considered in contrast to tartaric acid and may be readily obtained as a food grade acid.

Finally, with the use of certain shells, an improvement in the flavor of the product material has been effected by pretreating the by-product with an enzymatic material. To a mixture of by-product and water preheated to approximately 60° C. with or without the carbonate, an effective quantity of the enzyme is added, the mixture being maintained at that temperature for approximately one hour before raising the temperature to the approximately 95 to 100° C. level utilized for the one-hour extraction procedure. The enzyme digestion is believed to break down the cell walls thereby facilitating the removal of the flavor constituents from the shells.

It should be noted that extraction of the flavor ingredients from cocoa shell allows the recovery of a residue representing 75 percent of the original shell weight. This residue is perfectly suitable for utilization as an organic soil builder and fertilizer.

The syrup obtained by the extraction of shells and concentration of the extract as already generally described is comprised of about 25 percent dry matter. This dry matter is at least equivalent in flavoring strength to conventional cocoa powder. Thus it can be stated that 4 parts of the syrup referred to above is equivalent to 1 part of cocoa powder.

In addition to being substantially less expensive, various other advantages are realized through the use of this material. One major factor is the production of a lower fat cocoa-like flavoring material. While various processes are known for the production of cocoa powder, none results in a product having a fat content substantially below about 10 percent by weight. As will be seen from the examples hereinafter, the fat content of the cocoa-like flavoring material of this invention is less than 1 percent. Thus, the extract provided hereby is more healthful in that it contains substantially less objectionable highly saturated fats such as are present in cocoa powder. Additionally, this material in reducing the fat content is comparatively low calorie in contrast with cocoa powder, a factor particularly desirable to those interested in reducing their weight level.

Having now described the instant inventive concept in a general manner, the following examples are set forth in order to more specifically illustrate the same, although it is to be understood that these examples are not to be considered in a limiting sense.

EXAMPLE 1

Approximately 200 grams of by-product cocoa shells were soaked in one liter of water at 95 to 100° C. for approximately one hour. The liquid extract was filtered off using a suction technique and the residue was washed with about 300 milliliters of hot water. The filtrate and washings were concentrated approximately five times in a vacuum evaporator. This procedure was repeated utilizing (a) only coarse shells (b) only medium shells, and (c) only fines.

Taste tests were carried out by incorporating equivalent portions of various extracts into a standard drop cookie recipe. Control cookies were made from cocoa powder for comparative purposes. The recipe utilized was as follows:

| | |
|---|---|
| 1 cup brown sugar | ½ teaspoon salt |
| ½ cup shortening | 1 teaspoon baking soda |
| 2 eggs | ¼ cup milk |
| 1½ cup flour | 1 teaspoon vanilla |

Shell extract syrup (eq. to ½ cup cocoa powder)

Cream shortening and sugar together. Add vanilla. Add beaten eggs and continue to beat until fluffy. Sift flour and add to it baking soda and salt and sift again. Add dry ingredients alternately with milk. Beat until blended. Drop by teaspoonfuls onto a greased baking sheet. Space 2 to 3 inches apart. Bake at 370° for 10 to 12 minutes.

Most persons on the cookie taste panel found that the coarse shell extract yielded the strongest, most desirable flavor while the fines extract produced a weaker flavor. Medium shell extract was intermediate between the two. It was determined that approximately one-half of the quantity of coarse shell extract was sufficient to impart a satisfactory cocoa-like flavor to cookies as compared with the fines extract. Cocoa powder itself gave a weaker flavor which was found inferior to the coarse shell extract by the taste test panel.

EXAMPLE 2

The process of Example 1 was repeated utilizing only the coarse shells flaked to less than 1 centimeter in size and including in the water bath various quantities of mildly basic materials as follows:

(A) 5.3 grams of potassium carbonate; resulting pH of filtrate 6.9;

(B) 10 grams of ammonium carbonate; resulting pH of filtrate 7.9;

(C) 5.3 grams of sodium carbonate; resulting pH of filtrate 7.4; and, (D) 10 grams of sodium carbonate; resulting pH of filtrate 7.9.

The mixtures were then heated in an oven for one hour at about 100° C., filtered, the pH adjusted to about 5.0 with tartaric acid and concentrated to approximately 200 grams. The resulting extract of each sample was made into drop cookies as described in Example 1 along with control cookies utilizing an extract made without carbonate and further control cookies utilizing cocoa powder. Each of the carbonate-containing cookies were preferred over the control cookies made with carbonate-free extract, the use of the carbonate removing a somewhat strong, slightly bitter after-taste objected to by some members of the taste test panel with cookies formed of extract prepared without carbonate. While all of the carbonate-containing extract cookies were found comparable in chocolate taste to the cocoa powder cookies, cookies made utilizing Sample 2D, that is the 10 gram level of sodium carbonate were found most preferable by the panel. Although somewhat greater quantities of the sodium carbonate could be included in the extraction procedure, this is avoided because greater amounts have never shown superior performance and have in many cases shown poorer taste panel ratings. It is to be understood that shells differing insofar as variety, type of fermentation, etc. possess distinctly different requirements regarding amount of carbonate necessary.

EXAMPLE 3

As will be seen from Example 2, the pH of the filtrate is increased somewhat from an original level of approximately 5.2 by the use of the carbonate. Various tests were made wherein the pH of the final extract was lowered utilizing the following acidic materials:

(A) Adjust to pH 5 with tartaric acid;
(B) Adjust to pH 7 with tartaric acid;
(C) Adjust to pH 7 with phosphoric acid;
(D) Adjust to pH 5 with phosphoric acid;
(E) Adjust to pH 6 with phosphoric acid;
(F) Adjust to pH 7 with sulfuric acid; and
(G) Adjust to pH 5 with sulfuric acid.

The results of a taste test panel showed definite preference for a pH 7 phosphoric acid adjustment and a control cookie made without adjustment. A comparative cost evaluation indicates that the expense of utilizing tartaric acid to adjust the pH is approximately 6 times as high as phosphoric acid and better than 50 times as expensive as sulfuric acid. In addition to the taste preference for phosphoric acid-adjusted extract, this material must be considered more attractive because of its wide use and acceptance as a food grade acid. It is noted that by merely lowering the pH to 7 rather than to its initial pH of approximately 5, the cost of neutralizing acid is reduced by a factor of greater than 3. Although the pH 7 phosphoric acid-adjusted extract and the "no adjustment" control were considered equally satisfactory by the taste test panel, it is preferred to adjust the pH at least to its neutral point because most formulations in which this flavoring would be used are probably at or near a neutral pH.

EXAMPLE 4

Having arrived at the best possible carbonate-extraction and acid-neutralization conditions from coarse cocoa shells, tests were made to determine the effect of various enzymatic digestions. A comparison was studied of cookies formed using extracts made according to the following procedures:

(A) Formed by the procedure of Example 2D.

(B) An enzyme control extract formed by adding 200 grams of shells and one liter of tap water preheated to 60° C. and held in an oven for one hour at that temperature with approximately 10 grams of sodium carbonate being added. This solution was placed in a boiling water bath until the internal temperature reached approximately 95° C. and the mixture was maintained at from 95 to 100° C. for one hour, filtered, washed with 300 milliliters of hot water, cooled, the pH adjusted to 7 with phosphoric acid, and concentrated to 200 grams.

(C) The procedure of Example 4B was repeated except that 0.200 gram of Pectinol R10, and 0.200 gram of Gumase HP–150, enzyme materials manufactured by Rohm and Haas Company, were added to two separate mixtures prior to the 60° C. incubation period.

(D) Two additional tests were run as in Example 4C eliminating the sodium carbonate from the extracting mixture.

(E) An additional sample was prepared utilizing the process of Example 4D but eliminating both the enzyme and the sodium carbonate.

The results of comparison tests by a cookie taste test panel indicated that with certain shells the enzyme-digesting treatment produced a slightly improved flavor, while with other shells the carbonate control of Example 4A was found to be just as satisfactory. In all instances, comparative tests with cookies made from cocoa powder indicated a preference for the extract cookies.

EXAMPLE 5

Cocoa powder and the cocoa shell extract were analyzed simultaneously to determine whether or not the cocoa shell extract, when compared chemically with cocoa powder, would be expected to produce adverse physiological effects. Cocoa shell extract powder was prepared by extracting two batches of cocoa shells according to Example 2D and concentrating to 400 grams. The extract was then freeze-dried and 102 grams of extract solids recovered. It is pointed out that this procedure can be utilized, if desired, to produce a powdered extract, either freeze or spray drying the same, although for most purposes it has been found satisfactory to merely concentrate the extract to a syrup. However, for the purpose of this test, a powdered material was prepared by grinding the extract solids, this powder and a cocoa powder being subjected to chemical analysis according to the following procedures:

Moisture.—Moisture was determined by subjecting weighed samples of cocoa powder and shell extract to a temperature of 110° C. for two hours in a forced draft oven. The percent moisture was then calculated from the loss in weight.

Ash.—Ash was determined by igniting weighted samples in a muffle furnace for two hours at 550° C. and calculating the percent ash from the loss in weight.

Crude fat.—Crude fat was determined by a standard AOAC procedure in which a weighed sample was extracted with ether for four hours on a Bailey Walker apparatus. The ether was then evaporated in a tared weighing dish and the gain in weight of the dish taken as the amount of fat present.

Crude fiber.—Crude fiber was determined by a standard AOAC procedure in which a sample from the previous fat extraction was dried, combined with asbestos and refluxed with sulfuric acid and sodium hydroxide solutions for two consecutive half-hour periods. The sample was filtered, dried, weighed and ignited in a muffle furnace for one-half hour at 550° C. The sample was then weighed again and the loss in weight calculated as the amount of fiber present.

Crude protein.—Crude protein was determined by a standard micro-Kjeldahl procedure in which a quantity of sample was digested with 4 mls. of sulfuric salicylic acid for two and one-half hours on a Kjeldahl rack. When the solution cooled, it was diluted with a small amount of water and about 20 ml. of 40 percent sodium hydroxide. Then the mixture was distilled into a boric acid solution and the amount of nitrogen determined by titrating with standard sulfuric acid. Protein was calculated from the nitrogen value after first subtracting the alkaloid nitrogen found in the next determination.

Alkaloids.—Alkaloids were determined according to a procedure outlined by Moir and Hinks[1] for the analysis of foodstuffs containing cocoa material.

Two (2) grams of sample and 2.5 g. of freshly ignited magnesium oxide were rubbed to a smooth paste with a small quantity of 80 percent alcohol. The paste was transferred to a flask and refluxed 3 times for an hour and one-half with 100 ml. portions of 80 percent alcohol. The extracts were combined, concentrated, acidified with dilute hydrochloric acid, and washed into a 200 ml. graduated flask with hot water. The cooled solution was clarified with a combination of 5 mls. of zinc acetate solution, 6 mls. of glacial acetic acid, and 5 mls. of potassium ferrocyanide solution. The mixture was then made to volume, evaporated to small bulk and extracted 5 times with chloroform. The extracts were washed, the chloroform evaporated to dryness and the weight noted as a guide to later treatment. The percent nitrogen was determined by the Kjeldahl method previously described and the percent alkaloids calculated according to the following formula:

Percent alkaloids = N% nitrogen × 3.26

Tannins & Catechins.—Tannins and catechins were determined according to an AOAC procedure which has been modified slightly by Jensen[2] and Duthie.[3]

Five (5) grams of sample were shaken with 88 mls. of 40 percent acetone and allowed to extract overnight. The solution was then filtered, washed with 40 percent acetone, and made up to 100 ml. with distilled water. To 2 separate 25 ml. portions was added 150 mls. of saturated cinchonine sulfate and the solutions were allowed to stand overnight. Two solutions were then filtered through Gooch crucibles, washed with half saturated cinchonine sulfate, and the crucibles dried two hours at 104° C. The fitrate was retained for use in the next determination.

Tannins present = Weight of precipitate × 0.534

Catechins.—The filtrate from above was combined with 50 ml. of Stiasny's reagent and boiled for one hour under an air condenser. The precipitate was filtered off, dried for two hours in a vacuum desiccator, and weighed to determine the amount of catechins present.

The three analyses that follow were performed according to the procedures outlined in Technical Bulletin No. 1225, United States Department of Agriculture, entitled

[1] D. D. Moir and E. Hinks, analyst, 60, 439 (1935).
[2] H. R. Jensen, Analyst, 53, 365 (1928).
[3] D. W. Duthie, Analyst, 63, 27 (1938).

"The Chemical Composition of Representative Grades of the 1952 and 1954 Crops of Flue Cured Tobacco."

Total reducing substances.—One and one-half (1.5) g. of sample and 0.15 g. of calcium carbonate were mixed with 200 ml. of distilled water and refluxed for one hour on a magnetic stirrer-hot plate. The cooled solution was next transferred to a 250 ml. volumetric flask, made to volume and 50 ml. collected by filtration. Reducing power was then determined on the filtrate using the standard AOAC Folin-Wu method with glucose as a standard.

Total reducing sugars.—A one (1) g. sample was extracted with 80 percent alcohol in a Bailey-Walker apparatus for 5 hours. After transferring to a beaker the extract was evaporated on a steam bath until the odor of alcohol could no longer be detected. The cooled solution was transferred to a 100 ml. volumetric flask and 0.8 ml. of a neutral lead acetate solution added to precipitate the polyphenols. The solution was then de-leaded with 0.170 g. sodium oxalate, made to volume, filtered and Folin-Wu determinations made.

Polyphenols.—Polyphenols were measured as the difference between percent total reducing substances (as D-glucose) minus the percent total reducing sugars (as D-glucose) and are expressed as percent Polyphenols as (D-glucose).

|  | Percent Composition Dry Weight Basis | |
|---|---|---|
|  | Cocoa | Extract |
| Ash | 5.9 | 19.6 |
| Protein | 24.3 | 9.7 |
| Fat | 14.3 | 0.7 |
| Fiber | 10.1 | 0.4 |
| Reducing Substances (as Glucose) | 5.6 | 8.0 |
| Reducing Sugars (as Glucose) | 2.8 | 0.6 |
| Polyphenols (as Glucose by diff.) | 2.8 | 7.3 |
| Alkaloids | 1.6 | 2.6 |
| Tannins | 6.3 | 19.4 |
| Catechins | 1.8 | 12.0 |

It will be seen from the above that there are no materials present in the extract which might be expected to have any deleterious effect when used in food products for human consumption. In fact, the extremely low fat content will provide great advantages from the standpoint of eliminating cholesterol-forming highly saturated fats such as normally found in cocoa powder, and also in reducing the calorie content.

EXAMPLE 6

In order to test the storage stability of the extracts prepared according to the instant invention, bacteriological assays of these materials were made.

Three extracts of chocolate flavoring were carried out according to the procedure of Example 2D. The extraction products were mixed together and 50 g. samples were taken for storage tests in eight sterilized jars. Three jars were placed in a freezer, five jars were placed in a refrigerator while four more 50 g. samples were placed in jars and pressure-cooked for 15 minutes at 15 p.s.i. These jars lids were then tightened and stored at room temperature. The samples were removed from these test environments at seven days intervals and bacteriological profiles were determined. The results of these bacteriological analyses appear in the following table:

| Type of Sample | Storage Time, Days | Plate Count | Yeast and Mold | Coliforms |
|---|---|---|---|---|
| Refrigerated | 1 | 40,000 | 280 | 250 |
| Do | 7 | 30,000 | [1] N.S. | N.S. |
| Do | 14 | 48,000 | N.S. | N.S. |
| Do | 28 | 29,000 | N.S. | N.S. |
| Frozen | 7 | 40,000 | N.S. | N.S. |
| Do | 14 | 37,000 | N.S. | N.S. |
| Do | 28 | 35,000 | N.S. | N.S. |
| Canned | 1 | N.S. | N.S. | N.S. |
| Do | 7 | N.S. | N.S. | N.S. |
| Do | 14 | 6,500 | 550 | N.S. |
| Do | 28 | N.S. | N.S. | N.S. |

[1] N.S. = Not Significant.

EXAMPLE 7

Other edible products utilizing extract prepared according to the preferred process of Example 2D substituted for equivalent quantities of cocoa powder can be made according to the following procedures.

(A) Chocolate Pudding

2¼ cup milk (scald)

Combine and stir until well blended

¾ cup milk
¼ cup cornstarch
2 tablespoons sugar
¼ teaspoon salt
4–5 teaspoons shell extract syrup Add these ingredients to the hot milk. Stir and cook them over a very low flame, or in a double boiler, until they thicken and the cornstarch is cooked (when you can no longer taste it). Beat until light:

1 egg
2 tablespoons sugar

Pour the hot mixture over the egg, beat it and return it to the heat for a minute or two. Stir it constantly until the egg thickens, then remove it from the heat.

When cool add:

½ teaspoon vanilla

Chill the pudding.

(B) Chocolate Flavored Frosting 111 lbs. 12 oz. shortening
78 lbs. 8 oz. skim milk powder
110 lbs. chocolate flavor extract
2 lbs. 13 oz. salt
1 lb. vanilla flavor
15 oz. lecithin Cream the shortening and chocolate flavor extract together in a commercial Hobart mixer and mix until creamy. Next add the lecithin and the remaining ingredients and mix until blended to a homogeneous syrup.

(C) Chocolate Cake 2 cups brown sugar
½ cup shortening
2 eggs
⅓ cup hot water with 2 teaspoons baking soda added
2½ cups flour
1 cup buttermilk
1 teaspoon vanilla
1 teaspoon salt Cream shortening and sugar together, then add the vanilla and eggs and beat until fluffy. Next add the chocolate flavor extract and the hot water with baking soda. Finally add the flour and salt alternately with the buttermilk and mix until blended. Bake at 350° for 30–35 minutes.

(D) Breakfast Cocoa

For each cup of cocoa add an equal amount of the following ingredients:

1–2 tablespoons of chocolate flavor extract
1–2 tablespoons fo sugar
1 cup of milk Mix the chocolate flavor extract and sugar together in a sauce pan. Add milk and bring to a near boil. Allow to simmer 5 minutes and serve.

Each of the above will produce an edible food as good or better than the same product utilizing cocoa powder.

It will now be seen that there is herein provided an improved flavoring material and method of manufacturing the same, for use particularly in edible food products for human consumption in lieu of cocoa powder, the instant inventive concept satisfying all of the objectives set forth in the introduction, and others, including many advantages of great practical utility and commercial importance.

Since many embodiments may be made of the instant inventive concept, and since many modifications may be made of the embodiments hereinbefore described, it is to be understood that all matter herein is to be interpreted merely as illustrative and not in a limiting sense. Accordingly,

What is claimed is:

1. A method of making a flavoring material which comprises adding a quantity of a chocolate manufacturing by-product material consisting essentially of cocoa shells which have been separated from cocoa beans after roasting of said beans with the shells thereon to a bath which is essentially aqueous, maintaining said bath at an elevated temperature for a period of time sufficient to effect substantial extraction of the flavoring material, and recovering said flavoring material.

2. A method in accordance with claim 1 wherein said by-product is added to hot water and said bath is maintained at a temperature of approximately 95–100° C. for approximately one hour.

3. A method in accordance with claim 1 wherein said by-product is selected from the group consisting of coarse and medium grade cocoa shells and mixtures of the same.

4. A method in accordance with claim 3 wherein said shells are substantially all coarse cocoa shells.

5. A method in accordance with claim 4 wherein said shells are added in a ratio of approximately one part of coarse shells for each five parts of water.

6. A method in accordance with claim 1 wherein said flavoring material is recovered by separating the same from a residue of cocoa shells, further including the step of concentrating said flavoring material by removing a portion of its water content.

7. A method in accordance with claim 6 further including the steps of washing said residue with hot water, mixing said flavoring material with the wash water, and concentrating the mixture of flavoring material and wash water.

8. A method in accordance with claim 6 wherein said flavoring material is separated from said residue by subjecting the same to a suction filtration.

9. A method in accordance with claim 6 wherein said flavoring material is concentrated by subjecting the same to a vacuum-evaporation.

10. A method in accordance with claim 1 further including the step of including an effective quantity of a mild basic compound in said bath during the extraction procedure.

11. A method in accordance with claim 10 wherein said mild basic material is selected from the group consisting of sodium carbonate, potassium carbonate and ammonium carbonate.

12. A method in accordance with claim 10 wherein approximately 5 percent of sodium carbonate based on the weight of the by-product is included in said bath during the extraction procedure.

13. A method in accordance with claim 10 further including the step of adding a sufficient quantity of an acid to said flavoring material to lower the pH of the same.

14. A method in accordance with claim 13 wherein said acid is selected from the group consisting of phosphoric acid, sulfuric acid and tartaric acid.

15. A method in accordance with claim 13 wherein sufficient phosphoric acid is added to said flavoring material to lower the pH of the same to approximately 7.

16. A method in accordance with claim 1 further including the step of subjecting said by-product to an enzymatic digestion treatment prior to extraction of said flavoring material.

17. A method in accordance with claim 1 further including the steps of preheating said bath to approximately 60° C., adding an effective quantity of an enzymatic material to said bath to digest said by-product maintaining said bath at approximately 60° C. for approximately one hour, raising the temperature of said bath to approximately 95–100° C., maintaining said bath at approximately 95–100° C. for approximately one hour, and recovering said flavoring material.

18. A method of making a water-soluble cocoa-like flavoring material which comprises adding a quantity by-product material consisting essentially of coarse cocoa shells flaked to less than 1 cm. to a water bath in a ratio of approximately one part of shells for each five parts of water, adding a quantity of sodium carbonate to the mixture of shells and water in a ratio of approximately 5 percent based on the weight of the shells, maintaining the mixture of shells, sodium carbonate and water at a temperature of approximately 95–100° C. for approximately one hour to effect substantially complete extraction, and recovering the cocoa-like flavoring material.

19. A method of making a water-soluble cocoa-like flavoring material comprising roasting a quantity of cocoa beans in their shells, separating said shells from said beans, adding a quantity of said shells to a bath, which is essentially aqueous, maintaining the bath at an elevated temperature for a period of time sufficient to effect substantial extraction of the cocoa-like flavoring material, and recovering said cocoa-like flavoring material.

20. A method in accordance with claim 19 further including the step of classifying said shells after they have been separated from said beans into a coarse fraction, a medium fraction and a fines fraction, and adding substantially all shells selected from said coarse fraction to said water bath.

References Cited

UNITED STATES PATENTS 2,512,663 6/1950 Masurovsky _____ 99—23
2,954,293 9/1960 Rusoff _____ 99—26

FOREIGN PATENTS 562,123 6/1944 Great Britain.

A. LOUIS MONACELL, *Primary Examiner.*

D. M. NAFF, *Assistant Examiner.*